June 18, 1935. H. F. PETERSON 2,005,106
SHOP INSTRUMENT
Filed May 11, 1934
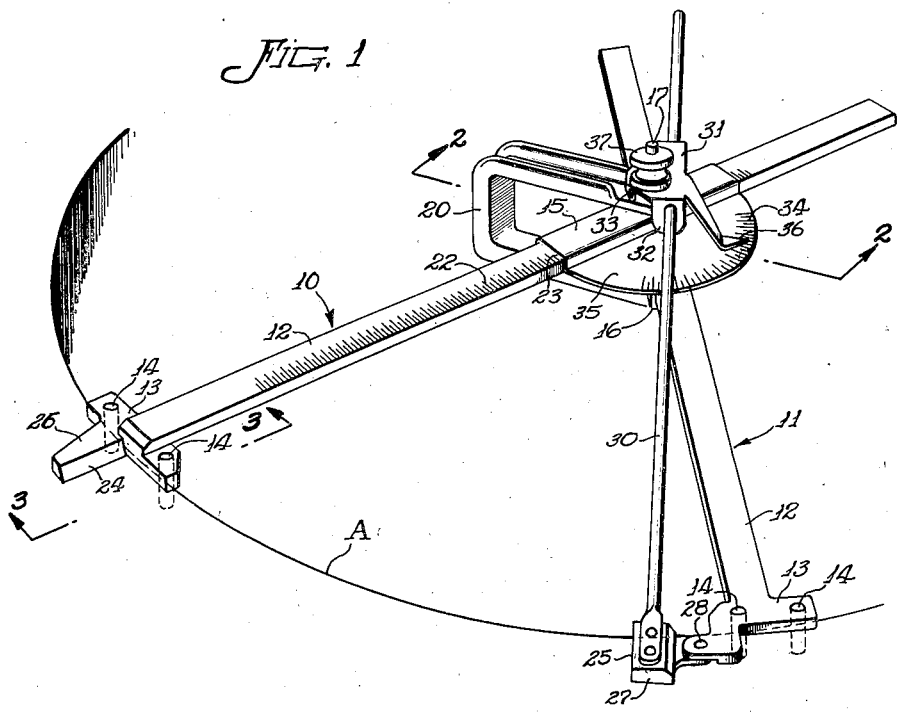
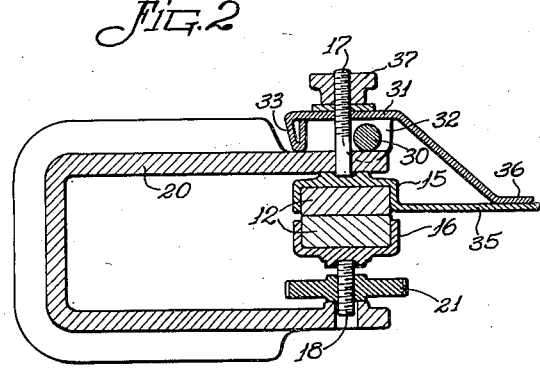
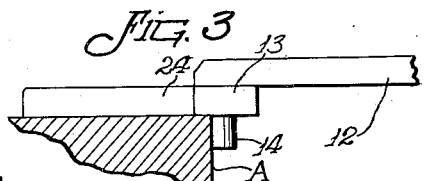
INVENTOR
Henry Ferdinand Peterson
By Chindahl, Parker & Carlson
ATTORNEYS Patented June 18, 1935

2,005,106

UNITED STATES PATENT OFFICE 2,005,106

SHOP INSTRUMENT

Henry Ferdinand Peterson, Rockford, Ill.

Application May 11, 1934, Serial No. 725,048

13 Claims. (Cl. 33—178)

The invention relates generally to measuring devices for use in machine shops for measuring and determining the curvature of arcs.

The general object of the invention is to provide an instrument of new and improved construction which may be used conveniently in a machine shop for determining the center and radius of curvature of arcuate surfaces and to measure and lay out arcs when the length, center, or radius of curvature are known.

The invention also resides in the construction of the instrument which enables small arcs to be laid out or measured and which facilitates adjustment of the instrument.

Other objects and advantages will become apparent from the following description taken in connection with the accompanying drawing, in which Figure 1 is a perspective view of a device embodying the features of the invention, showing the device applied to an arcuate surface.

Fig. 2 is a sectional view taken substantially on the line 2—2 of Fig. 1.

Fig. 3 is a sectional view taken on the line 3—3 of Fig. 1 and showing how the device is applied to the surface to be measured.

It is a known geometric principle that the intersection of the perpendicular bisectors of any two chords drawn across an arc determines the center and radius of the arc. The present invention utilizes this principle and, in the preferred embodiment shown in the drawing, comprises generally a pair of arms each of which is fashioned at one end to contact the arcuate surface at two annularly spaced points defining a chord of the arc. Connecting the arms is a means which pivotally supports the arms and likewise permits longitudinal adjustment thereof transversely of the pivotal axis which extends through the intersection of the perpendicular bisectors of the two chords. Combined with this structure is a means for determining the angular measurement of the arc.

As shown in the drawing, the two arms, indicated generally at 10 and 11, are T-shaped, each comprising a stem portion 12 in the form of a rigid metal bar and a head 13. The head 13 preferably extends perpendicularly to the stem portion 12 and is fashioned to contact with an arcuate surface, such as the surface A, at two points. In the present instance, contact is made by a pair of pins 14 mounted on the head portion 13. The pins 14 are spaced apart a substantial distance in order to locate the arm accurately relative to the surface.

Connecting the arms 10 and 11 is a means which permits the arms to be adjusted longitudinally, and which holds them in a pivotal relation. The axis of the pivot extends through the intersection of lines which are perpendicular to and bisect the lines connecting each pair of pins 14. This means comprises a pair of slides 15 and 16 in the form of channels slidably receiving the arms 10 and 11 and positioned to open toward each other so that the adjacent faces of the arms are in contact. To pivotally connect the arms, the slides 15 and 16 are respectively provided with pivot pins 17 and 18 extending from the outer faces thereof and rigidly attached thereto as by welding. Supporting the pins 17 and 18 is a U-shaped member 20 having a channel construction for rigidity. The slides are mounted between the ends of the U-shaped member with the pins rotatably mounted in the respective ends. A nut 21 is threaded on one of the pins preferably adjacent the inner face of the U-shaped member 20. To clamp the arms in any desired position, the nut 21 is turned into engagement with the inner face of the member 20, thereby forcing the arms together between the ends of the U-shaped member.

The pivot pins 17 and 18 are coaxial and extend through the intersection of the perpendicular bisectors of the lines joining the pins 14 on each arm. The axis of the pivot pins is thus the center of curvature of the arcuate surface A, when all four pins 14 are simultaneously in contact with the arcuate surface.

The radius of curvature of the arcuate surface is, then, the distance from the axis of the pivot pins 17 and 18 to the arcuate surface. To facilitate the determination of this radius, a scale 22 is provided, which is preferably marked on the upper face of the arm 10 and cooperates with the adjacent end of the slide 15, indicated at 23. The scale 22 is calibrated to give the radius directly by the reading indicated at the end 23 of the slide. A similar scale is provided on the arm 11 to cooperate with the slide 16 so that both arms may be set to the same radius, if the latter is already known.

Combined with the above described structure is a means for determining the angular measurement of an arc or for laying off a given angular measurement on the arc after the center and radius of curvature have been determined or if they are known. As shown herein, said means comprises a pair of straight edges 24 and 25 associated with the respective arms. The two straight edges are so constructed that they always extend radially from the pivot pins 17 and 18 when the arms are pivotally and longitudinally adjusted. Preferably the straight edge 24 is provided by a fixed integral extension 26 on the outer end of the head portion 13 of the arm 10 and extending radially from the pivotal axis of the arms. Because the head portions of each arm are of substantial width, the straight edge 25 is formed on a member 27 extending to one side of the head portion 13 on the other arm 11, so that the two straight edges may be moved into close proximity to each other to measure small angles without interference of the head portions.

Since the straight edge 25 is at one side of the arm 11 and cannot therefore be coincident with the perpendicular bisector of the line joining the pins 14 of the arm 11, the member 27 is pivotally attached to the arm 11 as by a rivet 28. To swing the member 27 on its pivot so that the straight edge 25 will always extend radially, a rod 30 is rigidly secured at one end to a member 27 and extends parallel to the edge 25. The other end of the rod 30 extends toward the U-shaped member 20 and is there supported so that it may be longitudinally adjusted, while the arm 11 is so adjusted. The rod is, however, held in a predetermined relation to the pivotal axis of the arms. To this end, an element in the form of a yoke 31 is mounted on the pivot pin 17 adjacent the outer face of one end of the U-shaped member 20. The yoke 31 has a pair of downwardly extending spaced arms 32, which are apertured to receive the rod 30. The yoke also has a flange 33 adapted to bear against the outer face of the U-shaped member. Thus, as the arms are swung relative to each other, the straight edge 25 will always be held in a radial position relative to the pivotal axis of the arms. To hold the yoke in place, a nut 37 is threaded on the outer end of the pivot pin 17.

To measure the angle between the straight edges, a protractor scale and a pointer are provided which are angularly fixed relative to the two straight edges. In the present instance, the protractor scale, indicated at 34, is marked on a semi-circular flange 35 extending from one side of and integral with the slide 15 which supports the arm 10 having the fixed straight edge 24. The pointer, indicated at 36, is formed integrally with the yoke 31 so that it is angularly fixed relative to the rod 30 and hence to the straight edge 25.

In using the instrument, assume that it is desired to determine the center and radius of curvature of an arcuate surface such as the surface A. The nut 21 is loosened so that the arms 10 and 11 and the rod 30 will be free to swing and slide. The four pins 14 and the two arms are placed adjacent the arcuate surface, in the manner shown in Figs. 1 and 3, and the slides 15 and 16 are moved along the arms until all four pins 14 are in contact with the arcuate surface at the same time and the chords defined thereby equidistant from the pivotal axis as determined by the scales 22. It is preferable to have the angle between the arms of substantial size to obtain accurate results, the maximum angle of course being determined by the length of the arcuate surface.

When the four pins 14 are simultaneously in contact with the arcuate surface and equidistant from the pivotal axis, the nut 21 is tightened to clamp the arms against longitudinal or pivotal movement. In this position of the parts, the axis of the pivot pins 17 and 18 is the center of curvature of the arcuate surface, and the radius is determined by the mark on the scale 22 coinciding with the end 23 of the slide 15.

When it is desired to determine the angular measurement of an arc or to lay off a given angle on the arcuate surface A, the arms are first set for the known radius of curvature and then swung relative to each other to position the straight edges 24 and 25 as read on the scale 34. The straight edge 24, since it is coincident with the perpendicular bisector of the line joining the associated pins 14, is always in a radial position. The straight edge 25 is likewise held in a radial position since the rod 30 is rigid therewith and is pivoted on the axis of the arms 10 and 11.

From the above, it will be apparent that I have provided an instrument suitable for use in a shop. By means of this instrument, the center and radius of curvature of an arcuate surface may be determined, and the angular measurement of the arc may be determined or a given angle laid out. The instrument may be readily applied to the work and yields accurate results without the exercise of great care on the part of the operator.

I claim as my invention:

1. An instrument of the character described comprising, in combination, a pair of elongated arms, means for supporting said arms for pivotal adjustment about a common axis and also for longitudinal adjustment transversely of said axis, each arm having a transversely extending portion at its free end providing two contact points spaced apart a substantial distance transversely of the arm and adapted to be placed in contact with an arcuate surface, the points on each arm defining a chord of said surface which is bisected by a perpendicular line extending through said axis, and straight edges on said arms disposed outwardly from said contact points and acting in all positions of the arms to define radii through said axis and perpendicular to said chords.

2. An instrument of the character described comprising, in combination, a pair of arms, a pair of slides supporting said arms for longitudinal adjustment, means pivotally connecting said slides, means at one end of each arm constituting a pair of points adapted to be placed in contact with an arcuate surface, the lines joining the points of each pair being bisected by radii perpendicular to said lines, and means associated with said slides for indicating the angle between said radii.

3. An instrument of the character described comprising, in combination, a pair of arms, each arm being fashioned at one end to contact an arcuate surface at two points to define chords thereof, a pair of slides respectively supporting said arms for longitudinal adjustment, a U-shaped member pivotally supporting said slides between its ends, and a single means operable to clamp said slides between the ends of said member and thereby hold said arms against longitudinal and angular movement.

4. An instrument of the character described comprising, in combination, a pair of arms each fashioned at one end to contact an arcuate surface at two points, a pair of slides supporting the respective arms for longitudinal adjustment, a U-shaped member having said slides positioned between its ends, pins pivotally connecting said slides and the respective ends of said member, and a nut threaded onto one of said pins and operable to clamp said arms between the ends of said member whereby to hold the arms against angular and longitudinal adjustment.

5. An instrument for determining the center and radius of curvature of an arcuate surface comprising, in combination, a pair of arms each fashioned to contact the arcuate surface at two points to define chords thereof, a pair of slides supporting the respective arms for longitudinal adjustment, means connecting said slides for angular adjustment about an axis passing through the center of curvature of said surface when said chords are equidistant from the axis, and cooperating means on said slides and said arms providing scales indicating radii of curvatures.

6. An instrument for determining the center and radius of curvature of an arcuate surface comprising, in combination, a pair of arms each fashioned to contact the arcuate surface at two points to define chords thereof, a pair of slides supporting the respective arms for longitudinal adjustment, means connecting said slides for angular adjustment about an axis passing through the center of curvature of said surface when said chords are equidistant from the axis, cooperating means on said slides and said arms providing scales indicating radii of curvatures, straight edges on the respective arms extending through said axis, and means associated with said arms and indicating the angular relation of said edges when said chords are equidistant from said axis.

7. An instrument of the character described comprising, in combination, a pair of arms each fashioned to contact an arcuate surface at two points, means for pivotally connecting said arms and constructed to permit longitudinal adjustment thereof transversely of the pivotal axis, one of said arms having a straight edge rigidly extending from its outer end on a radius through said axis, the other arm having a similar straight edge pivotally attached thereto, a rod rigid with said pivoted straight edge and slidably and pivotally supported by said means, and cooperating members for measuring the angle between said straight edges comprising an arcuate scale and a pointer, one of said members being movable with the arm having the rigid straight edge, the other member being movable angularly with said rod.

8. An instrument of the character described comprising, in combination, a pair of arms each fashioned to contact an arcuate surface at two points, means for pivotally connecting said arms and constructed to permit longitudinal adjustment thereof transversely of the pivotal axis, one of said arms having a straight edge rigidly extending from its outer end on a radius through said axis, the other arm having a similar straight edge pivotally attached thereto, and a rod rigid with said pivoted straight edge and slidably and pivotally supported by said means to maintain the pivoted edge coincident with a radius through said axis.

9. An instrument of the character described comprising, in combination, a pair of arms each fashioned for endwise abutment with an arcuate surface at two angularly spaced points, means for supporting said arms for pivotal and longitudinal adjustment thereof, one of said arms having a relatively fixed straight edge at its outer end extending radially from the pivotal axis and the other arm having a straight edge on the side toward the other arm to permit said straight edges to closely approach each other, the last-mentioned straight edge being pivoted to the arm to permit it to take a radial position, and means for holding the pivoted straight edge in a radial position relative to the pivotal axis of the arms in all positions of adjustment of the arms.

10. An instrument of the character described comprising, in combination, a pair of arms each fashioned to contact an arcuate surface at two angularly spaced points, means for supporting said arms for pivotal and longitudinal adjustment thereof, said arms having straight edges at their outer ends, and cooperating members carried by said means for measuring the angle between said straight edges, said members being fixed against angular movement relative to the respective straight edges.

11. An instrument of the character described comprising, in combination, a pair of arms each fashioned to contact the arcuate surface at two points, a pair of slides receiving the respective arms for longitudinal adjustment, means for pivotally connecting said slides, a pair of straight edges on the outer ends of the respective arms, and means for measuring the angle between said straight edges comprising an angular scale rigid with one of said slides to bear a fixed angular relation with one straight edge, and a pointer to cooperate with said scale pivoted on the pivotal axis of the slides and bearing a fixed angular relation to the other straight edge.

12. An instrument of the character described comprising, in combination, a pair of arms each fashioned to contact an arcuate surface at two points, a pair of channels slidably receiving said arms for longitudinal adjustment thereof, a U-shaped member pivotally supporting said channels between its ends, said arms respectively having a fixed straight edge and a pivoted straight edge on their outer ends, a rod rigid with said pivoted straight edge, and a part mounted on said U-shaped member to turn about the axis of said channels and slidably supporting said rod.

13. An instrument of the character described comprising, in combination, a pair of arms each adapted at one end to be placed in contact with annularly spaced points on an arcuate surface, means connecting said arms and constructed to permit pivotal adjustment thereof about a common axis and also longitudinal adjustment transversely of said axis, scales associated with the respective arms to permit the arms to be set at equal points of longitudinal adjustment, a pair of straight edges associated with the respective arms, one being fixed relative to its associated arm and the other being pivoted to its associated arm and being positioned on the slide toward the first arm to be able to closely approach the other straight edge as the arms are swung toward each other, and means for holding said pivoted straight edge radially of said axis comprising a rod rigid with the pivoted straight edge, a member positioned coaxially with the arms and slidably receiving said rod and means for indicating the angular relation of said arms.

HENRY FERDINAND PETERSON.